United States Patent
Robbins et al.

(10) Patent No.: US 6,361,086 B1
(45) Date of Patent: Mar. 26, 2002

(54) MECHANICAL LATCH

(75) Inventors: Norman B Robbins, Davison; Craig A Confer, White Lake, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/438,930

(22) Filed: Nov. 12, 1999

(51) Int. Cl.[7] .................................................. E05C 1/06
(52) U.S. Cl. ...................... 292/36; 292/32; 292/DIG. 5; 292/158; 296/224
(58) Field of Search ............................ 292/DIG. 5, 35, 292/36, 158, 166, 168, 174, 139, 146, 32; 296/224

(56) References Cited

U.S. PATENT DOCUMENTS

| 1,215,649 A | | 2/1917 | Gruber |
| 1,826,868 A | | 10/1931 | Dunn |
| 2,055,688 A | | 9/1936 | Halinka |
| 2,357,551 A | | 9/1944 | Schlage |
| 4,223,943 A | * | 9/1980 | Van Hulle et al. . 292/DIG. 5 X |
| 4,786,091 A | * | 11/1988 | Shiraishi et al. ............. 292/36 |
| 4,869,549 A | * | 9/1989 | Londeck et al. ............ 296/224 |
| 5,624,149 A | | 4/1997 | Tokarz |

* cited by examiner

*Primary Examiner*—Teri Pham Luu
(74) *Attorney, Agent, or Firm*—Ralph E. Smith (57) ABSTRACT

A mechanical latch for securing a moveable structure to a fixed is provided. The mechanical latch includes a movable catch pin and a proximity pin disposed within a housing cavity. Both pins are spring loaded to urge the pins towards the moveable structure, and both pins also include stops projecting therefrom to limit this movement. An insert member is attached to the housing between the pins and has an end which is engaged by the stops. In an engaged position, the catch pin interacts with a slot in the moveable structure. In the engaged position, the proximity pin and the moveable structure generate a gap between its stop and the insert which allows the other catch pin to be selectively drawn rearward from its latched condition. A peg carried by the catch pin is urged into the gap and against the insert which secures the catch pin in a latched condition. As the proximity pin and the moveable structure move progressively apart, the stop contacts the peg and forces it out of the gap, thereby allowing the catch pin to be moved into its static position ready for a subsequent operation to stow the moveable structure. The latched position of the catch pin being substantially identical to the static position of latch pin.

21 Claims, 6 Drawing Sheets

MECHANICAL LATCH

BACKGROUND OF THE INVENTION

1. Technical Field

The present invention generally relates to latches. More particularly, the present invention relates to a mechanical latch that can be reset in response to certain activities. More specifically, but without restriction to the particular embodiment and/or use which is shown and described for purposes of illustration, the present invention relates a mechanical hold down latch that is used to secure a vehicle top in a stowed position.

2. Discussion

Motor vehicles used for personal transportation are produced in many different types and styles in order to meet the needs of a wide variety of customers. Because of the various needs of different customers, automotive manufacturers produce large cars, small cars, minivans, trucks, sport utility vehicles, and convertibles. Convertibles are designed for a specific segment of customers that prefer or desire these types of vehicles. Convertibles have a vehicle top that can be placed in the up position where the top acts as a conventional vehicle roof. Convertibles also allow a vehicle top to be placed in a down or stowed position whereby the top is positioned such that the vehicle operators are exposed to the open air. It is this feel of open-air motoring that has made convertibles popular with consumers over the years.

When convertible tops are placed in the stowed position, there is a tendency for the top to vibrate and rattle while the vehicle is in motion. There is, obviously, a need to provide means to reduce the vibration that can cause noise and excessive wear and tear on the vehicle top.

SUMMARY OF THE INVENTION

Accordingly, it is a principal objective of the present invention to provide a truly versatile and unique latching system for securing a moveable structure to a structure that is stationary relative thereto.

It is also an objective of the present invention to provide a latch system for a convertible vehicle top.

It is another objective of the present invention to provide a latch mechanism for use to secure a vehicle top while the top is in the stowed position.

It is still another objective of the present invention to provide a latch system that can be cycled from unengaged to engaged and back.

It is a further objective of the present invention to provide a latch system that can be used to compensate for build variations in the motor vehicle.

It is yet a further objective of the present invention to provide a latch system that will reset to its static position after any contact therewith.

In one form, the present invention provides a mechanical latch for securing a moveable structure to a stationary structure, the moveable structure being the header structure of a vehicle top in the preferred embodiment. The mechanical latch includes a catch pin that is adapted to be received by a slot in the moveable structure. The latch is carried by housing having a cavity for reception of the catch pin and a proximity pin. Both the catch and proximity pins include a spring that urges the pins to move in a longitudinal direction towards the moveable structure. The catch pin and the proximity pin both include a stop projecting therefrom. An insert is provided that attaches to the housing and cooperates with the stops of the catch pin and proximity pin to limit longitudinal movement of the pins. The catch pin also includes a slanted peg that is urged towards the proximity pin by a spring attached thereto. When the proximity pin contacts the moveable structure, it is forced rearward thereby creating a gap between the stop thereof and the insert. When the releasing of the moveable structure is desired, the catch pin is translated rearward by the aid of a pin lever having a bracket and a cantilevered activation arm. As the catch pin is translated rearward, slanted peg is urged into the gap formed between the stop of the proximity pin and the insert. The contact between the peg and the insert locks the catch pin is a position longitudinally rearward of its static position called the latched position. If contact between the proximity pin and the moveable structure is reduced, then the stop thereof can contact the slanted peg and force it upward, thereby eliminating the gap. At this point, the catch pin is free to translate in a longitudinal manner until the stop of the catch pin contacts the insert to a static position.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
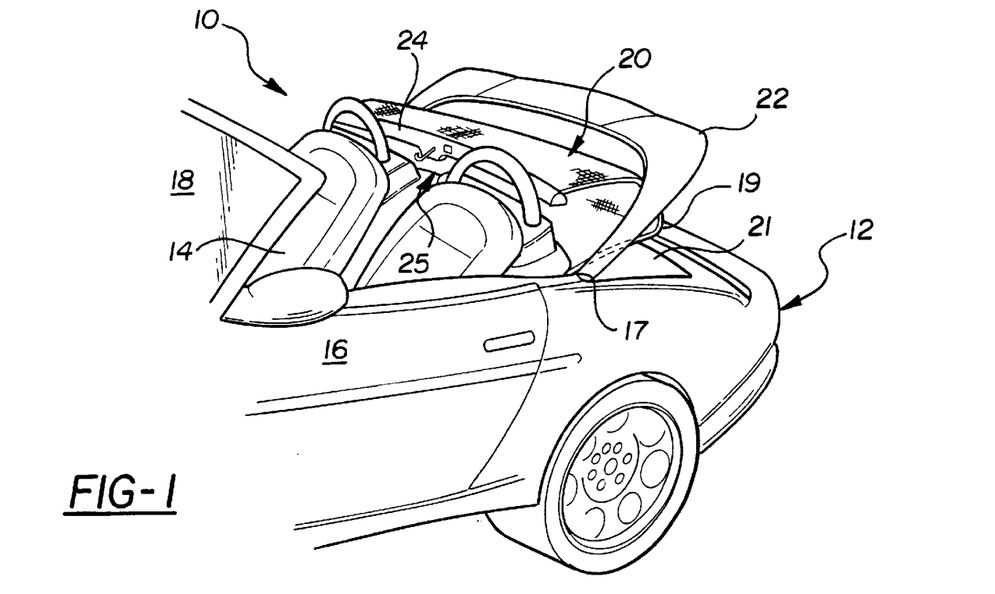
FIG. 1 is a perspective view of a vehicle having a convertible top with the top in the up position.
Figure 2:
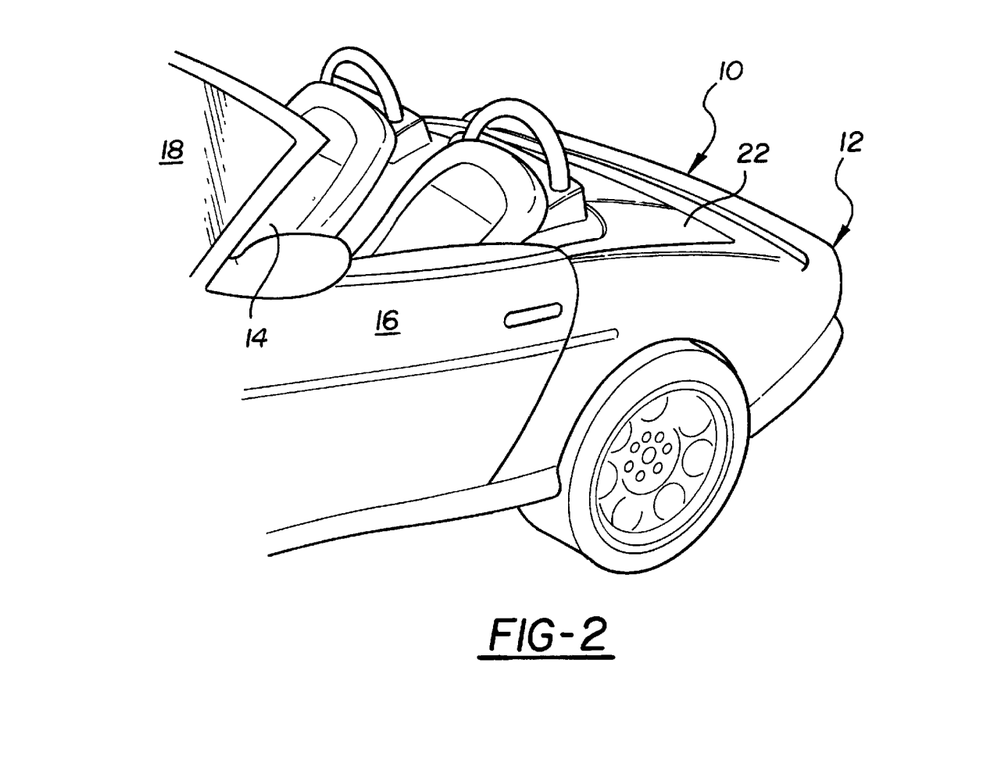
FIG. 2 is a perspective view of a vehicle having a convertible top with the top in the stowed position.

Referring to the drawings, FIG. 1 illustrates a motor vehicle 10 of the convertible type illustrating the present invention. Motor vehicle 10 has a body referred to generally by numeral 12 that surrounds a passenger compartment 14. Body 12 includes a pair of doors 16 that are adapted for access to passenger compartment 14. Doors 16 are disposed on opposing sides of passenger compartment 14 and rearward of the vehicle windshield 18 that projects upward from body 12. Motor vehicle 10 includes a convertible vehicle top 20 that can be translated from a closed position where it provides shelter to passenger to compartment 14 to a stowed position. FIG. 1 illustrates vehicle top 20 in a position between the closed position and the stowed position and FIG. 2 illustrates vehicle top 20 in the stowed position. In the stowed position, vehicle top 20 is disposed behind passenger compartment 14 in a recess 21 designed to receive top 20. During the translation of vehicle top 20, a cover bezel 22 is pivoted to open and allow greater access to recess 21. Vehicle top 20 typically pivots in two places 17 and 19 to provide for proper storage such that the forward most portion 24 of vehicle top 20 is disposed in recess 21 adjacent to passenger compartment 14 while in the stowed position. While in the stowed position it is desirable to reduce movement of vehicle top 20 to reduce noise and wear. A mechanical latch (not shown in FIGS. 1 and 2 but whose location is indicated generally by numeral 25) is provided to reduce movement of top 20 and is disposed in recess 21 adjacent to said passenger compartment 14 to contact the forward most portion 24 of vehicle top 20.

Figure 3A:
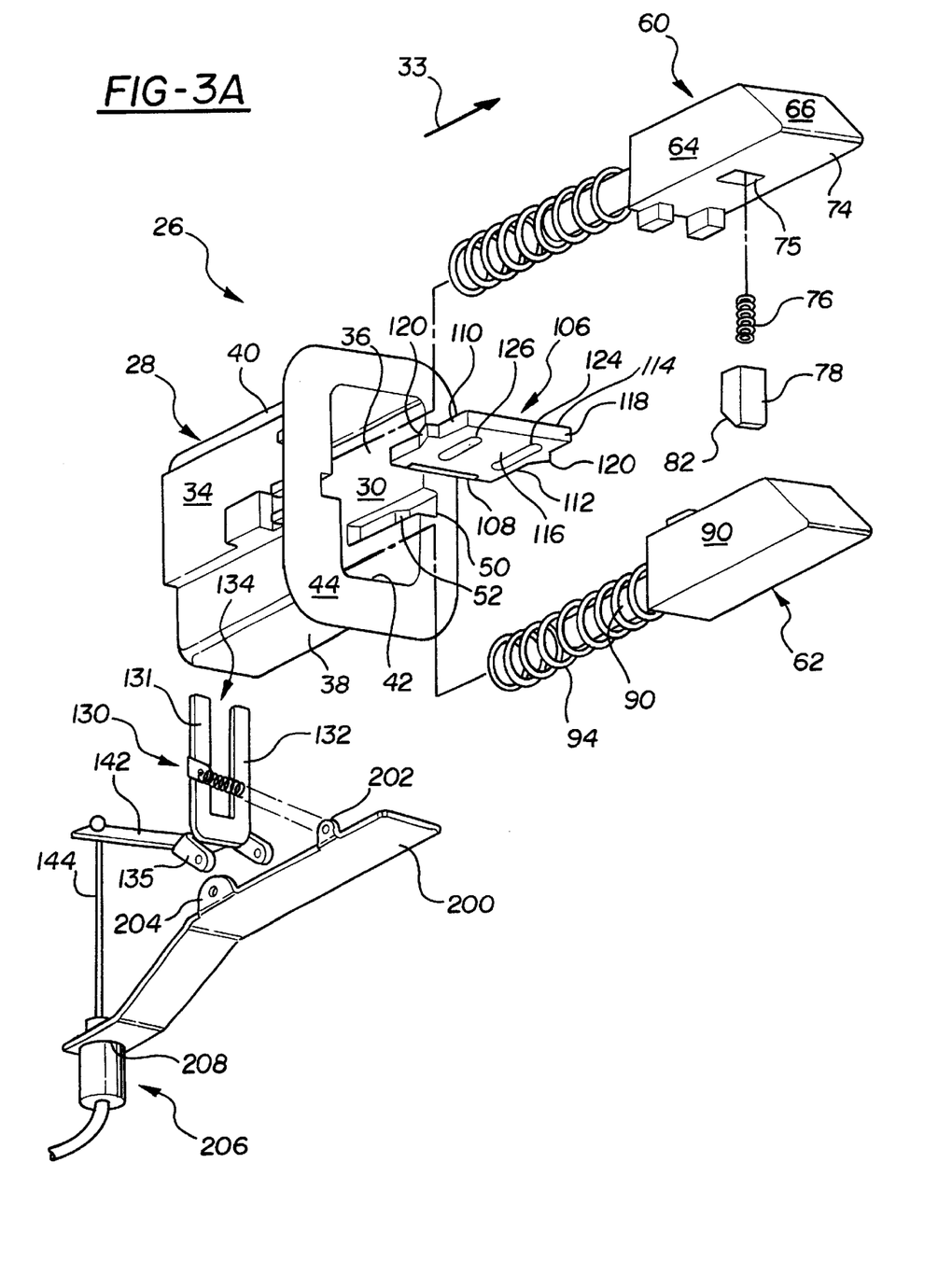
FIGS. 3A and 3B are exploded views of the latch assembly of the present invention.
Figure 3B:
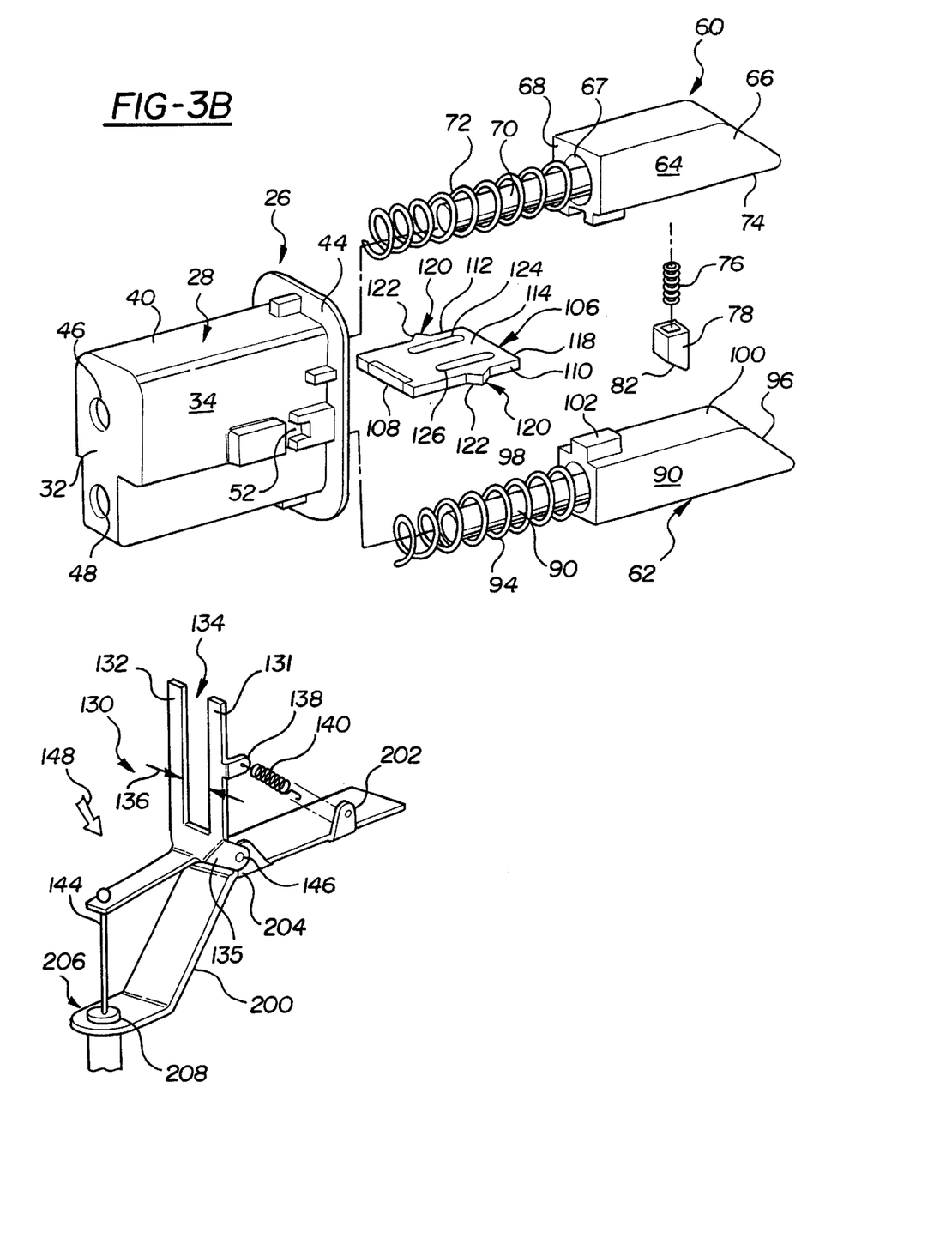

FIGS. 3A and 3B illustrate different views of the mechanical latch 26 of the present invention in an exploded arrangement. With reference to both views, mechanical latch 26 includes a housing 28 having a generally rectangular cavity 30 formed by back wall 32 and two opposing walls 34 and 36, a bottom wall 38, and a top wall 40 extending therefrom. Cavity 30 includes an opening 42 on the end opposite of back wall 32. Opening 42 is circumscribed by a bezel 44 that is connected to and projects outwards from two opposing walls 34 and 36, bottom wall 38, and top wall 40. Back wall 32 includes two preferably circular openings 46 and 48. A top opening 46 is disposed vertically above bottom opening 48. Side walls 34 and 36 each includes a slot 50 formed substantially parallel to the top wall 40 and the bottom wall 38. Each slot 50 includes a hole 52 formed therein a specified distance from bezel 44.

Cavity 30 is adapted to receive a top catch pin 60 and a bottom proximity pin 62 through opening 42. Top catch pin 60 includes a main rectangular body 64 that includes a slanted front surface 66. Extending from the back surface 68 of the body 64 is a control rod 70 that is adapted to be received by the top circular opening 46 in the back wall 32 of housing 28. Control rod 70 is disposed through the center of a circularly wound spring 72. Spring 72 contacts the back wall 30 of housing 28 on one end and contacts back surface 68 of body 64 on the opposing end, more specifically a circular counterbore 67 formed on back surface 68 on the opposing end. Spring 72 acts to force the body 64 of the top catch pin 60 away from the back wall 32 and towards the vehicle top 20 in a longitudinal direction indicated generally by arrow 33 (see FIGS. 3A and 4). Body 64 also includes a bottom surface 74 that includes a recess 75 formed therein to receive a spring 76 and a slanted peg 78. Slanted peg 78 is hollow forming a counterbore to receive one end of spring 76 therein. Spring 76 urges the slanted peg 78 downward. Slanted peg 78 includes an angled end surface 82 that faces the back wall 32 of housing 28. Bottom surface 74 of body 64 also includes a pair of stops 84 that project downward therefrom. Stops 84 are substantially identical and spaced a distance 86 apart.

It should be appreciated that the elements described as springs in the present invention could be any type of resilient element that can provide a spring force to the desired component. Metal circularly wound springs are used in the preferred embodiment of the present invention but the invention is not limited to this type of spring, any resilient element that provides a spring force would be within the scope and fair meaning of the present invention.

Bottom proximity pin 62 includes a body 90, control rod 92, spring 94, slanted front surface 96, and a back surface 98. The control rod 92 is adapted to be received by the bottom circular opening 48 disposed in the back wall 32 of housing 28. The bottom proximity pin 62 includes a top surface 100 that includes a stop 102 that is centrally located on the width of the body 90. Stop 102 is adapted is slide between the distance 86 between the pair of stops 84 projecting from the bottom surface 74 of the top catch pin 60, therefore, the width of stop 102 is less than the distance 86.

Also included in the mechanical latch 26 is insert 106. Insert 106 is generally flat and plate like in construction and includes a rear face 108, two opposing side faces 110 and 112, a top face 114, a bottom face 116, and a forward face 118. Opposing side faces 110 and 112 each include an outwardly projecting clip formation 120 adapted to be secured within holes 52 in the opposing walls 34 and 36 of the housing 28. Clip formations 120 include a rearward facing angled surface 122. Insert 106 also includes two oval shaped voids 124 and 126 that extend through the insert from the top face 114 to the bottom face 116. Voids 124 and 126 are adapted to provide flexibility and allow inward movement or retraction of clip formations 120 when the insert 106 is inserted into slots 50 of the opposing side walls 34 and 36 of the housing 28. Angled surface formation 122 is adapted to facilitate this inward movement. When the clip formations 120 reach the holes 54, the clip formations 120 project into holes 52 to secure insert 106 in housing 28.

The mechanical latch 26 also includes a pin lever 130 that is pivotally attached near the back wall 32 of the housing 28 via pivot flange 135. Pin lever 130 includes two upward extending posts 131 and 132 that define a U-shaped bracket 134. The U-shaped bracket 134 is adapted to receive the free end of control rod 70 that extends through the top opening 46 and the free end of control rod 92 that extends through the bottom opening 48. It should be appreciated that the distance 136 between the upward extending posts 131 and 132 is greater than the diameter of each rod 70 and 92, thereby allowing longitudinal movement of the control rods 70 and 92 therein. Post 131 includes an attachment finger 138 that is adapted for securing a spring 140 thereto. Spring 140 is preferably attached to a spring attachment tab 202 of a bracket base 200. Bracket base 200 is preferably coupled to a structural part of the vehicle, such as a vehicle cross member (not shown). Pin lever 130 also includes an activating arm 142 cantilevered from the pivot flange 135. The activating arm 142 is connected to a cable 144 to provide remote mechanical pivoting activation thereof. The cable 144 is extends through a bore formed in bracket base 200 and is connected to a switch or lever in the passenger compartment 14 of the vehicle 10. When the switch or lever is activated, a tension force is introduced to cable 144, which imposes a force on activating arm 142 of the pin lever 130. The bracket base provides positioning and strength to cable 144 in a localized area. This tension force causes pin lever 130 to pivot about pivot point 146 in a direction indicated by arrow 148. Pivot pin 146 is preferably attached to pivot pin tab 204 projecting from bracket base 200. The pivoting motion causes spring 140 to extend. When the tension of cable 144 is removed, spring 140 retracts and returns pin lever 130 to its stationary position whereby U-shaped bracket 134 is in contact with the back wall 32 of housing 28.

Assembly of latch mechanism 26 begins by placing the bottom surface 74 of the top catch pin 60 adjacent to the top surface 114 of insert 106 thereby forces slanted peg 78 into recess 75 formed in bottom surface 74. Rear wall 108 of insert 106 is positioned against the forward edge of stops 84. Then top surface 100 of proximity pin 62 is brought into contact against bottom surface 116 of insert 106. Stop 102 should then be disposed in the space 86 created between the pair of stops 84 with the forward edge of the stops 84 in contact with rear edge 108. This arrangement is then slid into housing 28 until clip formations 120 are locked in holes 52 as described earlier in the description of the preferred embodiment. Once insert 106 is in place, the longitudinal motion of catch pin 60 and proximity pin 62 is limited by the contact of stops 84 and 102 with the rear face 108 of insert 106.

Figure 4:
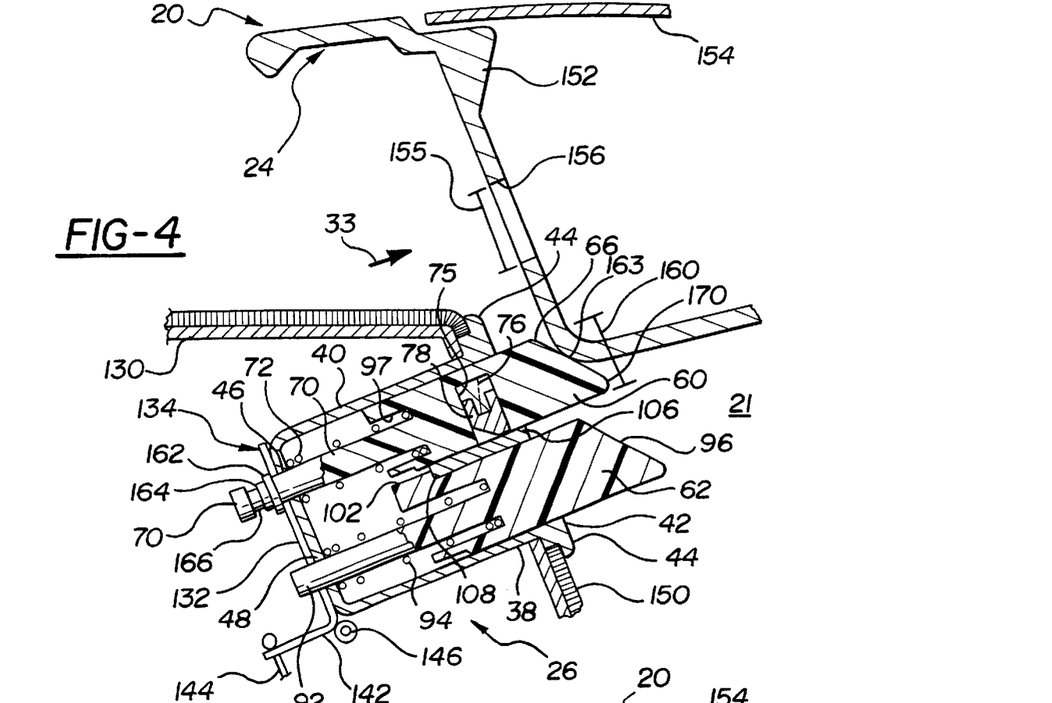
FIG. 4 is cross sectional view through the latch assembly of the present invention in the static position as the vehicle top is moving from the up position to the stowed.

With reference to FIG. 4, once the mechanical latch 26 is assembled a C-shaped clip 162 is placed in a groove 164 formed in the control rod 70 of the top catch pin 60. C-shaped clip 162 bends outward slightly during installation and then resiles when in place to form a snug fit within groove 164. C-shaped clip 162 provides a larger radius to control rod 70 such that upward extending posts 131 and 132 of the U-shaped bracket 134 can contact clip 162. Control rod 70 includes a second groove 166 formed closer to the free end of the control rod 70 than is groove 164. The function of the second groove 166 will be described in detail subsequently.

FIG. 4 provides an assembled mechanical latch 26 illustrated in a cross sectional view of its static position. Mechanical latch 26 is disposed in a stationary or fixed body 150 at the forward edge of recess 21 as shown in FIG. 1. Fixed body 150 is stationary relative to the vehicle top 20. The vehicle top 20 folds in such a way that the forward most portion 24 thereof is stowed adjacent to the forward edge of recess 21. Forward most portion 24 of vehicle top 20 includes a header structure 152 comprised of steel, aluminum, rigid plastic, or another structural material that extends laterally across top 20. A fabric 154 is preferably attached to header structure 152 that substantially covers the entire vehicle top 20. Header structure includes a slot 156 formed therein to cooperate with the catch pin 60 of mechanical latch 26 to secure the vehicle top 20 in the stowed position as shown in FIG. 2. The height 155 of slot 156 is slightly larger than the height 160 of the top catch pin 60 to facilitate ready reception of the catch pin 60 therein.

It should be appreciated that the bottom proximity pin 62 is retained in the rest position shown in FIG. 4 by contact between its stop 102 and end surface 108 of insert 106. In the same manner, catch pin 60 is retained in the rest position shown in FIG. 4 by contact between stops 84 and end surface 108 of insert 106. Stops 84 are not visible in FIG. 4 because stops 84 are not disposed along the centerline of the mechanical latch 26 and pin 60 in the cross sectional view in FIG. 4.

Figure 5:
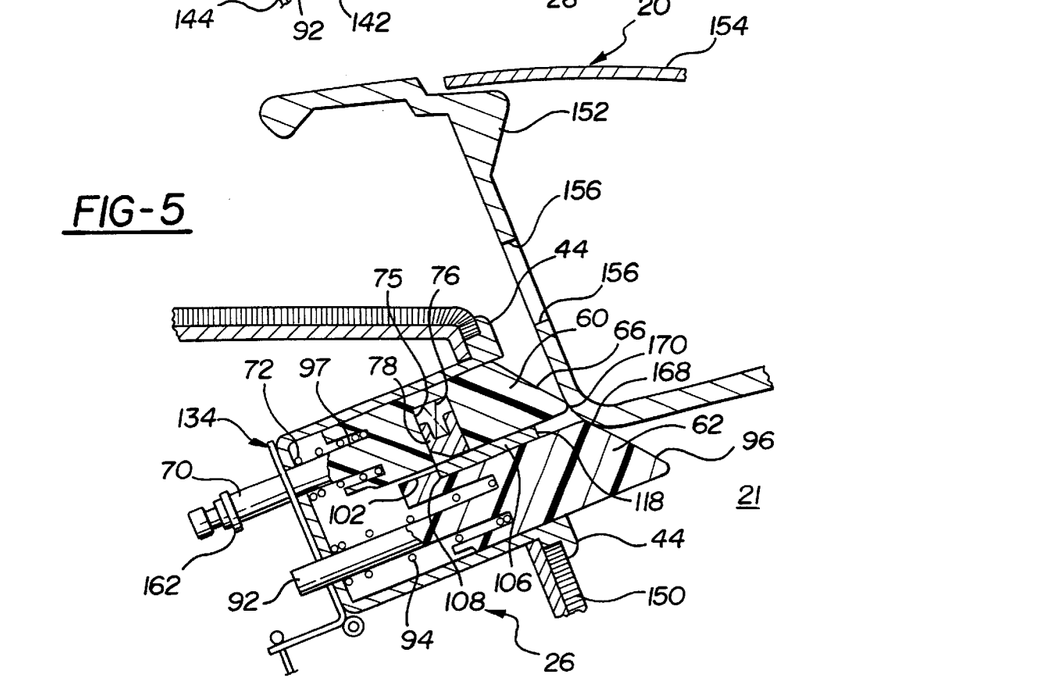
FIG. 5 is a cross sectional view through the latch assembly of the present invention as the vehicle top is moved downward from the position shown in FIG. 4.
Figure 6:
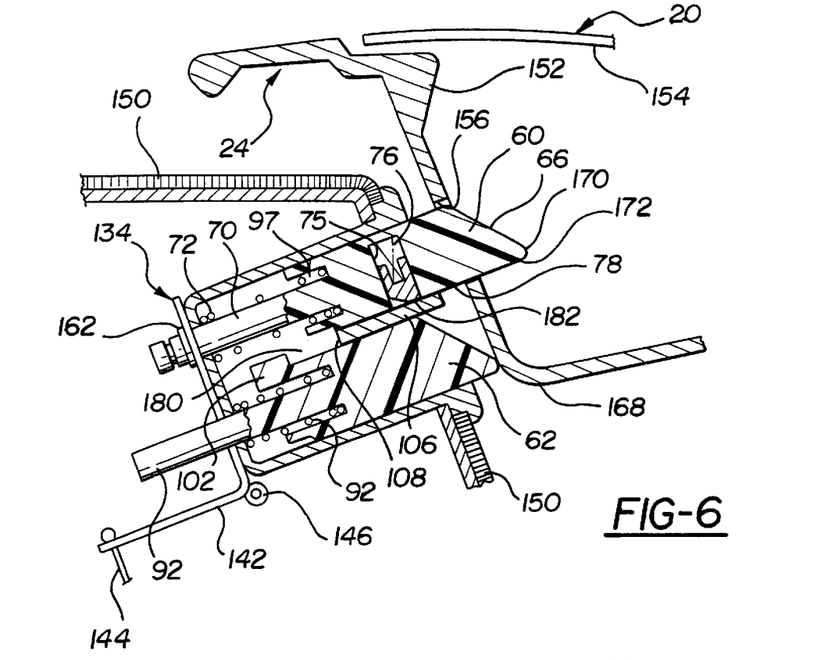
FIG. 6 is a cross sectional view through the latch assembly of the present invention with the catch pin engaged and the vehicle top in the stowed position.

Slanted front end 66 of top catch pin 60 is adapted to contact the header structure 152 of the vehicle top 20 as the forward edge 24 of top 20 is moved downward into recess 21. Header structure 152 has a curved lower edge 168 to progressively contact the slanted front end 66 of catch pin 60. As top 20 is moved downward, the body 64 of top catch pin 60 is moved rearward into cavity 30 against the urging of spring 72. FIG. 5 illustrates this inward movement of the top catch pin 60 as the top 20 is moved into a stowed position. As top 20 is moved further downward, curved lower edge 168 of header structure 152 next contacts the slanted front face 96 of the proximity pin 62, as shown in detail in FIG. 5. As top 20 is moved even further downward, proximity pin 62 is progressively translated further rearward. This continues until the front edge 170 of the slanted front end 66 reaches slot 156 in the header structure 152. As front edge 170 of the slanted front end 66 reaches slot 156, spring 72 forces body 64 of top catch pin 60 forward until stops 84 contact rear surface 108 of insert 86 (not shown in the cross sectional view). In this position, the top catch pin 60 extends into slot 156 such that a portion 172 thereof blocks vertical movement of the header structure 152 of the vehicle top 20. This position is defined by an engaged catch pin 60 and top 20 in the stowed position as is illustrated in FIG. 6. It should be appreciated that the engaged position of the catch pin 60 is substantially identical to its static position as shown in FIG. 4. Catch pin 60 limits vibration and movement of vehicle top 20 while in the stowed position. It should be appreciated that while top 20 in the stowed position, the bottom proximity pin 62 is still maintained by structure 152 such that a gap 180 is formed rearward of insert 106 along the centerline of the proximity pin 62.

Figure 7:
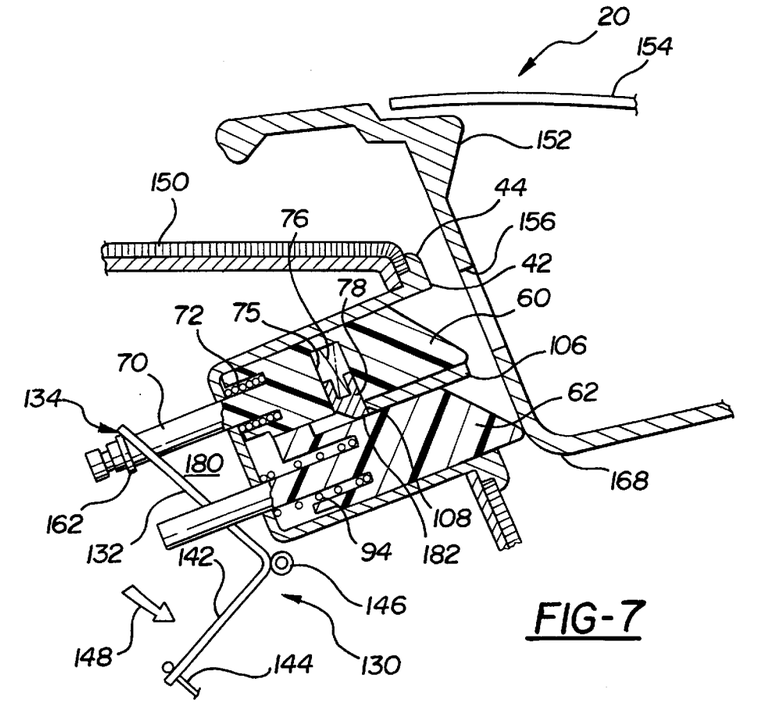
FIG. 7 is a cross sectional view through the latch assembly of the present invention with the vehicle top in the stowed position and the catch pin retracted in a latched condition.

To remove vehicle top 20 from the stowed position, an operator of the vehicle activates a lever or the like that applies tension to cable 144 and applies a force on activating arm 142 to cause pivoting 148 of pin lever 130 about pivot point 146 against the force of spring 140 (Not shown in FIG. 7 due to cross-sectional view). Pin lever 130 is pivoted as illustrated in FIG. 7 such that U-shaped bracket 134 contacts clip 162 attached to control rod 70 of top catch pin 60 which moves the top catch pin 60 rearward to the left. Pin lever 130 forces top catch pin 60 rearward until the forward edge 182 of slanted peg 78 passes the rear face 108 of insert 106. As forward edge 182 reaches gap 180 between face 108 and stop 102, spring 76 forces slanted peg 78 downward into gap 180 such that after the tension in cable 144 is removed, top catch pin is locked into a position rearwardly of its static and engaged position. This position is called the latched position and is illustrated in FIG. 7.

Figure 8:
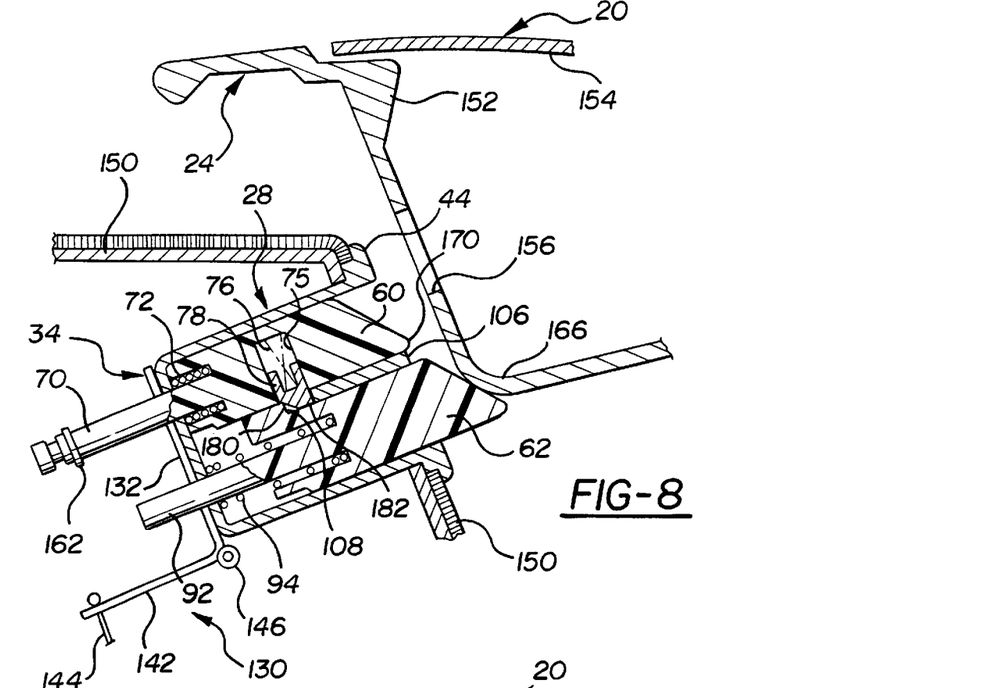
FIG. 8 is a cross sectional view through the latch assembly of the present invention with the vehicle top raised slightly from the stowed position with the catch pin still retracted in a latched condition.

With top catch pin 60 removed out from slot 156, vehicle top can be raised from its stowed position. As top 20 is raised as shown in FIG. 8, the edge 168 of header 152 allows the proximity pin 62 to move forward under the influence of spring 94. As proximity pin 62 is forced forward, gap 180 diminishes in size due to stop 102 moving forward therewith. As stop 102 of proximity pin 62 moves forward, it contacts angled surface 82 of the slanted peg 78 and moves peg 78 upward against the spring 76 as shown in FIG. 8.

Figure 9:
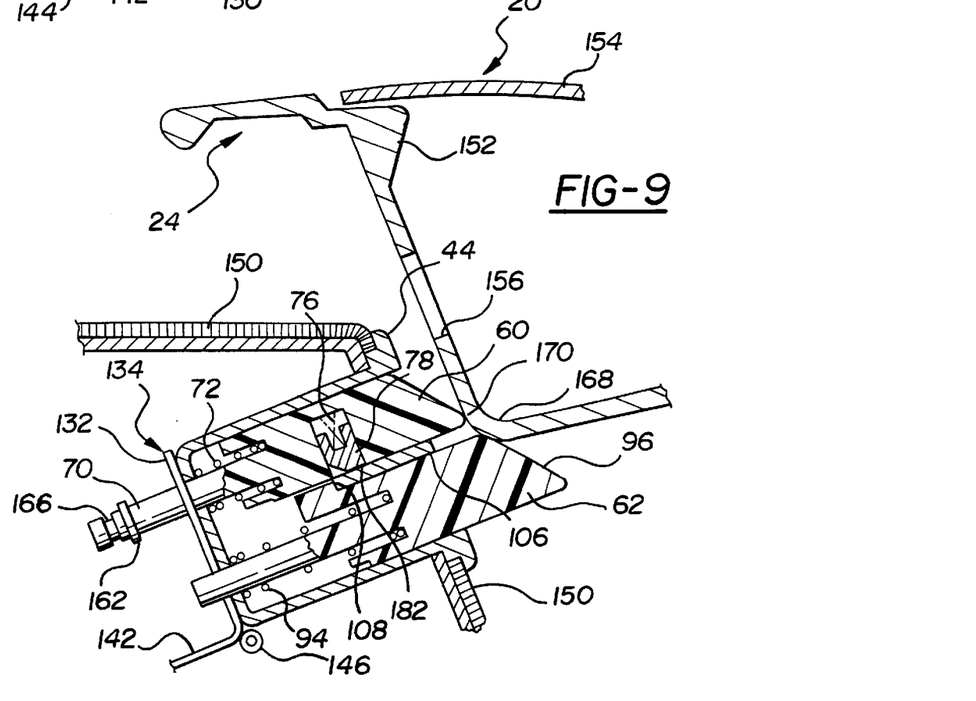
FIG. 9 is a cross sectional view through the latch assembly of the present invention with the vehicle top raised such that the lower proximity pin is fully extended.

As top 20 is raised further as shown in FIG. 9, stop 102 moves to the right to completely close gap 180 and move peg 78 upwards sufficiently to eliminate horizontal contact between peg 78 and rear face 108 of insert 106. This frees the top catch pin 60 to translate forward to the right with the assistance of spring 72 as shown in FIG. 9. At this point, the top 20 can be raised to reduce contact with mechanical latch 16 and the two pins 60, 62 are reset to their static positions as shown in FIG. 4. It should be appreciated that when the proximity pin 62 closes gap 180, slot 156 of header structure 152 has been moved sufficiently above the top catch pin 60. Therefore, longitudinal movement of the top catch pin 60 towards the vehicle top will not result in insertion of catch pin 60 into slot 156 thereby allowing top 20 to be freely moved upwards.

The present invention provides many advantages other than those specifically described above, for example, the present invention is versatile and adaptable to a vehicle build process. Often acceptable tolerances of one part can be magnified when parts of a conglomerate are assembled. This type of build-up tolerances can affect the position of vehicle top 20 in the stowed position. If every part in the assembly is built with little or no deviation from design, then the situation shown in FIG. 4 will occur. On the other hand, it may occur where the assembly of the top 20 deviates slightly from design and it is impractical to disassemble the top 20 for slight deviations. These variance can cause the header structure 152 of the top 20 to be disposed further away from fixed body 150 than desired. If this occurs, the present invention can be modified to adapt to the situation. A modified insert 106 can be used to allow the catch pin 60 and the proximity pin 62 to extend further into recess 21. This is accomplished by simply having an insert 106 with less structure behind the clip formations 120, thereby allowing catch pin 60 and proximity pin 62 to translate farther away from the back wall 32 of the housing 28 before stops 84 and 102 contact insert 106. The modified insert 106 is essentially identical but includes a rear surface that is moved away from rear wall 32, as shown in dotted lines in FIGS. 3A & 3B. If such an insert is used the c-shaped clip 162 is placed on the groove 166 closest to the distal end of control rod 70 to compensate for the shifted position of the catch pin 60. Another advantage of this design is the fact that the latch 26 will always return to the static position when not in contact with any other object. Therefore, if for some reason contact with the latch is initiated by a person or object other than the vehicle top, the latch will reset to the static position as soon as such contact is removed, this prevents the possibility of the latch getting stuck in an improper position by various contact therewith.

While the above description constitutes the preferred embodiment of the invention, it will be appreciated that the invention is susceptible to modification, variation, and change without departing from the proper scope or fair meaning of the accompanying claims. Modifications would include providing electronic controls or actuation of portions or the apparatus.

What is claimed is:

1. A latch for coupling a fixed structure to moveable structure, said moveable structure having a slot formed therein, said latch comprising:
    a catch pin having a first spring element that urges said catch pin towards said moveable structure, said catch pin adapted to be received by said slot of said moveable structure and includes a first stop projecting therefrom;
    a proximity pin having a second spring element that urges said proximity pin towards said moveable structure, said proximity pin is adapted to contact said moveable structure and includes a second stop projecting therefrom;
    an insert adapted to contact said second stop projecting from said proximity pin to limit the movement thereof, said insert also adapted to contact said first stop projecting from said catch pin to limit movement thereof.

2. The latch as set forth in claim 1, wherein said insert and said second stop of said proximity pin cooperates to form a gap while the proximity pin is in contact with said moveable structure.

3. The latch as set forth in claim 2, wherein said catch pin also includes a slanted peg urged towards said insert by a third spring element, said slanted peg capable of being urged into said gap whereby said slanted peg limits the movement of said catch pin while in said gap by contact with said insert.

4. The latch as set forth in claim 3, wherein said second stop of said proximity pin can contact said slanted peg while said peg is disposed within said gap and force said peg upwards to allow said catch pin to move in the longitudinal direction until said first stop projecting from said catch pin contacts said insert.

5. The latch as set forth in claim 1, further comprising a pin lever, said pin lever includes a pivot point and a bracket for contacting said catch pin that extends therefrom, said pin lever also include a cantilevered activation arm, as force is imparted on said arm, said bracket causes said catch pin to translate away from said moveable structure.

6. The latch as set forth in claim 5, further comprising a housing disposed within said fixed body, said housing forms a cavity for reception of said catch pin and said proximity pin.

7. The latch as set forth in claim 6, wherein said pin lever also includes a fourth spring attached to said bracket to return said bracket to a position contacting said housing when said force imparted on said arm is diminished.

8. The latch as set forth in claim 7, wherein said housing includes a hole and said insert includes a clip formation adapted to be received by said hole in said housing.

9. A latch for coupling a fixed structure to a moveable structure, said moveable structure having a slot formed therein, said latch comprising:
    a catch pin having a first spring that urges said catch pin towards said moveable structure, said catch pin adapted to be received by said slot of said moveable structure, said catch pin includes a first stop projecting therefrom and a slanted peg;
    a proximity pin having a second spring that urges said proximity pin towards said moveable structure, said proximity pin adapted to contact said moveable structure, said proximity pin includes a second stop projecting therefrom;
    an insert adapted to contact said second stop projecting from said proximity pin to limit the movement thereof, said insert also adapted to contact said first stop projecting from said catch pin to limit movement thereof;
    wherein said insert and said second stop of said proximity pin cooperates to form a gap while the proximity pin is in contact with said moveable structure for selective reception of said slanted peg.

10. The latch as set forth in claim 9, wherein said first stop projecting from said catch pin comprises two projections spaced a predetermined distance apart and wherein said second stop projecting from said proximity pin comprises one projection disposed to operate between said two projections of said catch pin.

11. The latch as set forth in claim 10, wherein said slanted peg is urged towards said insert by a spring, said slanted peg capable of being urged into said gap whereby said slanted peg limits the movement of said catch pin while in said gap by contacting said insert.

12. The latch as set forth in claim 11, wherein said second stop of said proximity pin can contact said slanted peg while said peg is disposed within said gap and force said peg upwards to allow said catch pin to move in the longitudinal direction until said first stop projecting from said catch pin contacts said insert.

13. The latch as set forth in claim 12, further comprising a housing having a cavity formed therein for reception of said catch pin and said proximity pin.

14. The latch as set forth in claim 13, wherein said catch pin comprises a first body and a first control rod extending therefrom, said first body includes a first slanted front face for contacting said moveable structure and a recess for receiving said slanted peg.

15. The latch as set forth in claim 14, wherein said proximity pin comprises a second body and a second control rod extending therefrom, said second body includes a second slanted front face adapted for contacting said moveable structure.

16. The latch as set forth in claim 15, wherein said housing includes a back wall having a first and second opening formed therein and a side wall having a slot formed therein that includes a hole, said first opening adapted to receive said first control rod of said catch pin and said second opening adapted to receive said second control rod of said proximity pin.

17. The latch as set forth in claim 16, wherein said insert include a clip formation for insertion into said hole of said slot formed in said side wall of said housing.

18. The latch as set forth in claim 17, further comprising a pin lever, said pin lever includes a pivot point and a bracket for contacting said catch pin that extends therefrom, said pin lever also include a cantilevered activation arm, as force is imparted on said arm, said bracket causes said catch pin to translate away from said moveable structure.

19. The latch as set forth in claim 18, wherein said first control rod includes a groove adapted to receive a clip, said clip adapted for contact with said bracket of said pin lever.

20. The latch as set forth in claim 18, wherein said first control rod includes a plurality of grooves adapted to receive a clip, said clip adapted for contact with said bracket of said pin lever.

21. A latch for coupling a vehicle body to a header structure of a convertible top, said header structure having a slot formed therein, said latch comprising:

a housing having a cavity formed therein disposed in said vehicle body, said housing including a back wall having a first and second opening therein;

a catch pin disposed within said cavity and adapted to be received by said slot of said structure, said catch pin includes a control rod with a spring that urges said catch pin away from said cavity and a first stop projecting therefrom, said control rod adapted to be received by said first opening of said back wall, said catch pin also includes a spring loaded slanted peg;

a proximity pin disposed within said cavity adapted to selectively contact said header structure, said proximity pin includes a control rod with a spring that urges said proximity pin away from said cavity and a second stop projecting therefrom, said control rod adapted to be received by said second opening of said back wall; and an insert disposed between said catch pin and said proximity pin adapted to contact said second stop projecting from said proximity pin and said first stop projecting from said catch pin to limit the movement of said catch pin and said proximity pin;

wherein said second stop projecting from said proximity pin and said insert cooperate to form a gap while proximity pin contacts said header structure, said gap adapted to receive to spring loaded slanted peg.

* * * * *